March 30, 1948.  F. WALLER  2,438,878
METHOD AND APPARATUS FOR PROJECTING MOTION PICTURES
Filed June 30, 1945  3 Sheets—Sheet 1
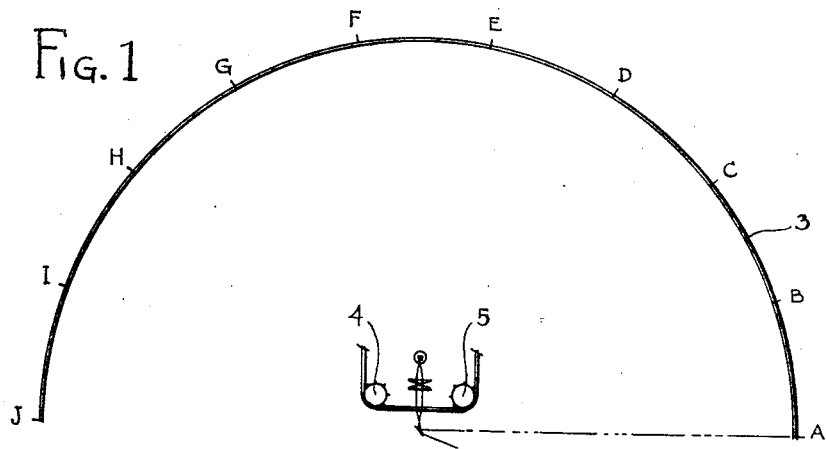
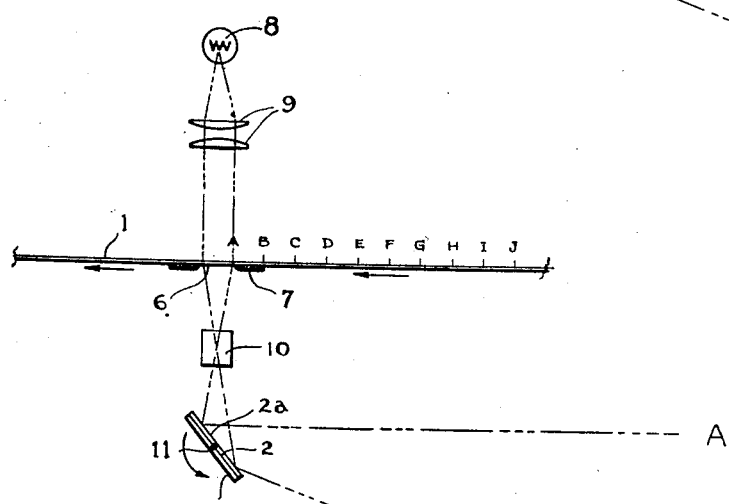
INVENTOR.
Fred Waller
BY
Emery, Varney, Whittemore & Dix
Attorneys March 30, 1948.　　　　F. WALLER　　　　2,438,878
METHOD AND APPARATUS FOR PROJECTING MOTION PICTURES
Filed June 30, 1945　　　3 Sheets-Sheet 2
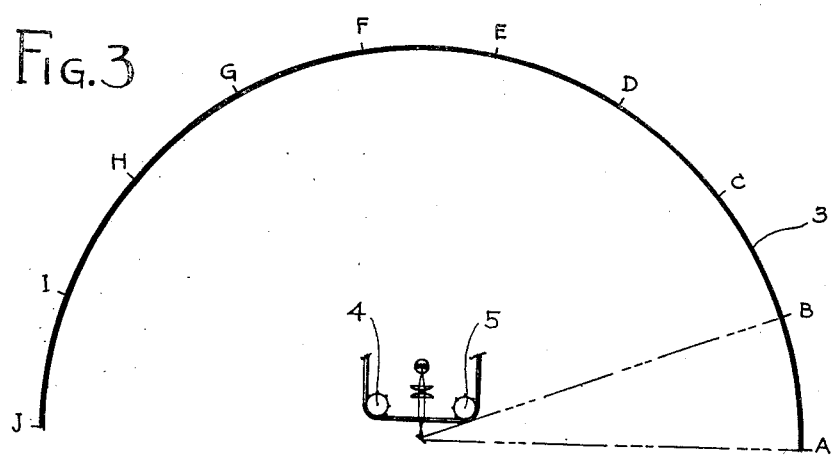
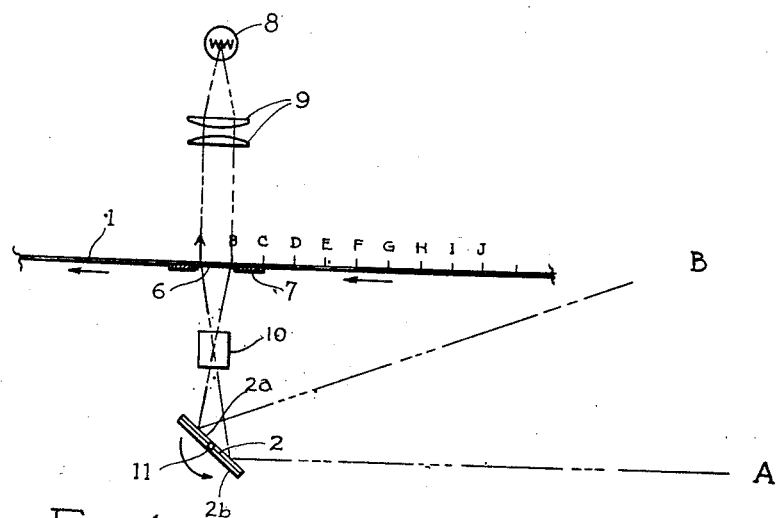
INVENTOR.
Fred Waller March 30, 1948. F. WALLER 2,438,878
METHOD AND APPARATUS FOR PROJECTING MOTION PICTURES
Filed June 30, 1945 3 Sheets-Sheet 3
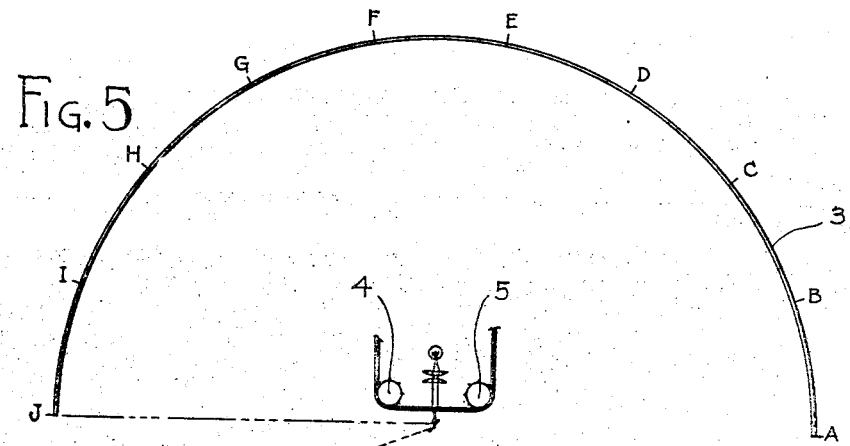
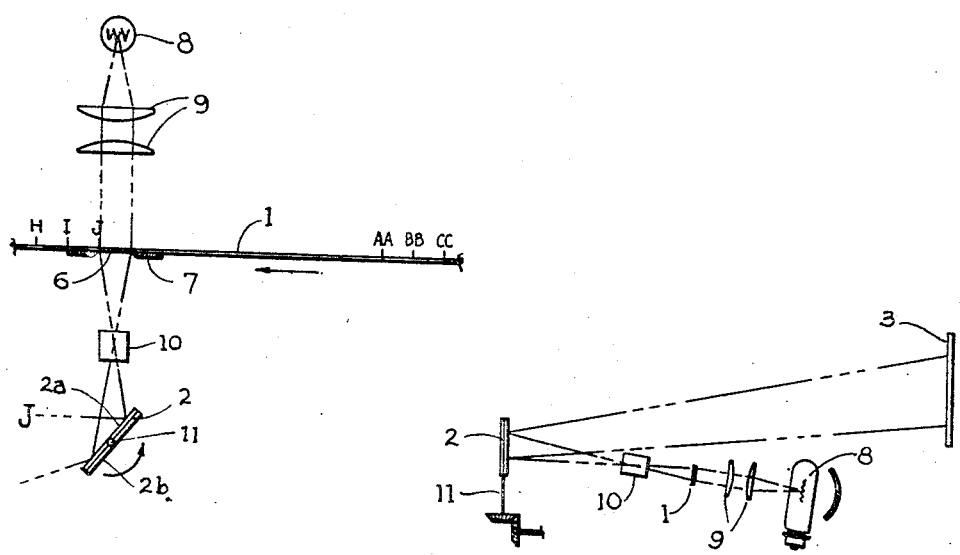
Fig. 5
Fig. 6    Fig. 7
INVENTOR.
Fred Waller
BY
Emery, Varney, Whittemore & Dix
Attorney.

Patented Mar. 30, 1948

2,438,878

UNITED STATES PATENT OFFICE 2,438,878

METHOD AND APPARATUS FOR PROJECTING MOTION PICTURES

Fred Waller, Huntington, N. Y., assignor to The Vitarama Corporation, Huntington Station, Long Island, N. Y., a corporation of New York Application June 30, 1945, Serial No. 602,522

7 Claims. (Cl. 88—16.8)

This invention relates to methods and apparatus for projecting motion pictures, and has as an object the provision of what may be called a scanning method of projection in which a continuously (non-intermittently) moving film carrying a succession of film frame images is scanned by a beam of light, and in which each successive image is projected in successive increments across a screen.

The invention is particularly applicable to panoramic or wide angle projection in which it is desired to project an image onto a concave curved screen of large area, as for example a cylindrical or spherical screen in which it is desired to project an image over a wide arc of said screen, say 90° or more in the horizontal plane and over any suitable arc in the vertical plane.

The invention to be described hereinafter constitutes modifications of or improvements on the inventions set forth in copending applications of Willis Robert Dresser and myself, Serial No. 520,592, filed February 1, 1944, now Patent Number 2,413,269, issued December 24, 1946, and Serial No. 528,044, filed March 25, 1944, now Patent Number 2,392,440, issued January 8, 1946.

A preferred embodiment of the invention selected for purposes of illustration is shown in the accompanying drawings, in which, Figures 1, 3 and 5 are semi-diagrammatic top plan views showing successive stages of projection of a film frame image onto a curved screen.

Figures 2, 4 and 6 are similar semi-diagrammatic views, on an enlarged scale of the projection apparatus, the positions shown in Figures 2, 4 and 6 corresponding to those shown in Figures 1, 3 and 5 respectively.

Figure 7 is a semi-diagrammatic side elevation.

According to the present invention, the film to be projected is fed continuously (non-intermittently) through a gate or other suitable film guide means which is provided with an aperture through which the beam of light which scans the film may pass. The aperture should be of a length substantially less than the length of the film frame images, and the gate may be either straight or curved in the region of the aperture. As each successive film frame passes the gate aperture, successive increments of the image thereon are scanned by the beam of light, which emanates from a fixed source, so that successive increments of the image are projected as the image passes the aperture. After passing through the gate aperture and film, the beam of light passes through a fixed objective lens system, and is received on a rotating mirror which reflects the beam and the increment of the image which is being scanned by the beam against the screen, thereby forming on the screen a projected image of that increment of the film image. As successive increments of the film frame image are scanned, corresponding successive increments are reflected against successive areas of the screen by the rotating mirror, until the entire film frame image has been so projected.

In order that the projected image may be stationary on the screen, even though the beam reflected from the mirror is a moving beam, certain relationships must be observed, taking into account the following variables: (1) velocity of the film through the gate, (2) the angular velocity of rotation of the mirror, (3) the length of each film frame image, and (4) the arc of the projection area of the screen. If the velocity of the film is represented by $V^f$, the velocity of rotation of the mirror is represented by $V^m$, the length of the film frame image is represented by L, and the arc of the projection area of the screen is represented by A, the necessary relationships may be expressed by the formula $$\frac{V^f}{L} = \frac{V^m}{\frac{A}{2}}$$

Furthermore, in order to use a continuously rotating mirror system including a plurality of mirror surfaces, if desired, and in order that successive film frame images may be properly spaced along the film strip to cause each successive projected image to be properly located on the screen, certain other relationships must be observed, taking into account the following variables: (1) the distances between successive film frame image centers, (2) the length of each film frame image, (3) the number of mirror surfaces, and (4) the arc of the projection area of the screen. If the distance between successive film frame image centers is represented by D, the length of each film frame image is represented by L, the number of equally spaced mirror surfaces is represented by N, and the arc of the projection area is represented by A, the necessary relationships may be expressed by the formula $$\frac{D}{L} = \frac{\frac{360°}{N}}{\frac{A}{2}}$$

Applying these formulae to a specific situation where it may be desired, for example, to project the image onto a concave curved cylindrical screen having a projection area covering an arc of 180° from a film having film frame images 1" in length, and assuming that it is desired to advance the film at the rate of 1" per second, it would be necessary to rotate the mirror at the rate of 90° per second (15 R. P. M.) to project a stationary image onto the screen. Moreover, if it is desired to use a single mirror surface, the distance between successive film frame image centers would be 4", so that there would be a blank space 3" in length between the trailing edge of one film frame image and the leading edge of the next successive film frame image.

If, therefore, under the conditions assumed, it is desired to project successive images at the rate of 50 per second in order to avoid flicker, it will be seen that the film must be advanced at the rate of 200" per second, which, in turn, requires that the mirror be rotated at the rate of 18,000° per second (3000 R. P. M).

Obviously, however, if two mirror surfaces are used, arranged back to back, so that their directions of reflection are spaced at 180°, the distance between successive film frame image centers would need be only 2", in which case the film must be advanced at the rate of 100" per second and the mirror system must be rotated at 9000° per second (1500 R. P. M.). Likewise if four mirrors are used, arranged in a square, so that their directions of reflection are spaced at 90°, the distance between successive film frame centers would be only 1" in which case the film must be advanced at the rate of 50" per second and the mirrors must be rotated at 4500° per second (750 R. P. M.).

As a second example of specific conditions, it may be assumed that it is desired to project onto a cylindrical screen having a projection area covering an arc of 120° from a film having film frame images 1" in length, using a mirror system having three mirrors arranged in the form of a triangle. In this case, the distance between successive film frame centers would be 2" and if the projection rate is 50 per second, the film must be advanced at the rate of 100" per second and the mirror system must be rotated at the rate of 6000° per second (1000 R. P. M.).

In the drawings, I have shown, in semi-diagrammatic form, a single exemplary apparatus embodying the invention in which successive film frame images on the film strip 1 are reflected by a rotating mirror system 2 for projection onto a cylindrical screen 3 having a projection area covering an arc of 180°. For purposes of illustration the length of the film frame image is exaggerated, and each image is assumed to be of a length A—J, with intermediate points of the image designated by the letters B, C, D, E, F, G, H, and I, being arbitrarily indicated for reference purposes.

The film strip is advanced continuously at a constant rate by suitable sprockets 4 and 5 driven in any suitable manner, the film strip being fed past a suitable aperture 6 in the gate 7. Light from a suitable light source 8 passes through a condenser lens system 9 which directs the beam through the aperture 6 to a fixed objective lens system 10, through which it passes to the rotating mirror system 2 for reflection to the screen 3. In the embodiment illustrated, the mirror system comprises two reflecting surfaces 2a and 2b arranged back to back so that their directions of reflection are spaced at 180°. The mirror system is mounted to rotate on an axis 11 which is preferably substantially at the center of curvature of the screen 3. The mirror system is rotated in synchronism with the film feed mechanism, of course, to cause the required velocity relationships to be maintained as previously explained. Such synchronization may be effected by known means, either mechanical or electrical.

Figures 1 to 6 illustrate the manner in which a succession of stationary images are projected onto the screen when the relationships previously described are properly observed. In Figures 1 and 2, the leading edge A of the film frame image A—J has just entered the gate aperture 6, and the mirror has reached a position such that the image of point A is reflected for projection onto the screen at point A'.

In Figures 3 and 4, the film has advanced to a position such that point B of the film image is at the position previously occupied by the point A, and the point A is about to leave the gate aperture. Under the conditions assumed, while the film is moving the distance A—B, the mirror would have rotated through an angle of 10°, so that, as shown in Figure 3, the image of point A continues to be reflected for projection at point A', and the image of point B is now reflected for projection at point B'.

Likewise, and in similar manner, as the film continues its advance, and as the mirror rotates in synchronism therewith, additional increments of the film frame image are scanned at the aperture, to cause additional increments of the projected image to be spread onto the screen. Thus, the images of points C, D, E, F, G, H, I and J are scanned and reflected successively for successive projection at points C', D', E', F', G', H', I' and J' of the screen, with each point of the projected image stationary on the screen at all times. Figures 5 and 6 represent the final stage of the projection of the image A—J, the image of the point J, being reflected for projection at J'.

At this point, it will be seen that the mirror surface 2b has not yet advanced to a position to begin to reflect the next successive image. Consequently, there must be a space between the trailing edge J of the image A—J and the leading edge AA of the next image, and applying the formula previously stated to the conditions assumed, it appears that the distance between successive film frame image centers is twice the length of a film frame image. Consequently the space between the trailing edge J of the first film frame image and the leading edge AA of the next successive film frame image must be equal to the length of a film frame image, in which case when the film has advanced sufficiently to bring the point AA to the aperture, the mirror surface 2b will have rotated to a position such that the image point AA will be reflected for projection at point A', thus beginning the projection of the second film frame image. This proceeds, as before, to project the image in successive increments across the screen as successive increments of the film frame image are scanned at the gate aperture.

In this connection it may be stated that in cases where the conditions are such as to require a space between successive film frame images which are to be projected, it does not necessarily mean a waste of film, nor does it require an excessively long film strip for a performance of given duration. Thus, it is easily possible to fill what have previously been called "spaces" with another series of film frame images. In the operation previously described it will be apparent from the drawing that the images of such series will not be projected onto the screen. However, if after completing the projection of the first series, the film strip is readjusted with respect to the mirror system to bring the images of the second series into proper cooperative relationship thereto, the second series may be projected by reversing the direction of movement of the film strip and the direction of rotation of the mirror system, thereby rewinding the film strip while projecting the second series.

It will be understood that the invention may be variously modified and embodied within the scope of the subjoined claims.

I claim as my invention:

1. The method of projecting motion pictures upon a concave curved screen, which comprises continuously advancing a film having a series of film frame images thereon through a gate having an aperture shorter than the length of said images so that only a portion of each of said images is exposed at one time, scanning the advancing film with a stationary beam of light passing through that portion of a film frame image which is exposed by said aperture, said beam impinging upon a mirror and being reflected thereby onto said curved screen, and rotating said mirror continuously to rotate the reflected beam to sweep the projection area of the screen, said mirror being rotated at an angular velocity such as to project successive increments of each film frame image successively onto said curved screen with each increment projected thereon as a stationary image.

2. The method of projecting motion pictures upon a concave curved screen, which comprises continuously advancing a film having a series of film frame images thereon through a gate having an aperture shorter than the length of said images so that only a portion of each of said images is exposed at one time, scanning the advancing film with a stationary beam of light passing through that portion of a film frame image which is exposed by said aperture, said beam impinging upon a mirror and being reflected thereby onto said curved screen, and rotating said mirror to rotate the reflected beam to sweep the projection area of the screen, said mirror being rotated in timed relation with the advancing movement of the film such that as the leading edge of one of said film frame images enters said gate aperture its image is projected at one edge of the projection area of said screen, as the center point of said film frame image reaches the center point of said aperture its image is projected at the center of the projection area of the screen, and as the trailing edge of said film frame image leaves said gate aperture its image is projected at the opposite edge of the projection area of said screen.

3. The method of projecting motion pictures upon a concave curved screen, which comprises continuously advancing a film having a series of film frame images thereon through a gate having an aperture shorter than the length of said images so that only a portion of each of said images is exposed at one time, scanning the advancing film with a stationary beam of light passing through that portion of a film frame image which is exposed by said aperture, said beam impinging upon a mirror and being reflected thereby onto said curved screen, and rotating said mirror continuously to rotate the reflected beam to sweep the projection area of the screen, said mirror being rotated at an angular velocity which bears the same ratio to one half of the arc of the projection area of the screen as the linear velocity of the film bears to the length of a film frame image.

4. The method of projecting motion pictures upon a concave curved screen, which comprises continuously advancing a film having a series of film frame images thereon through a gate having an aperture shorter than the length of said images so that only a portion of each of said images is exposed at one time, scanning the advancing film with a stationary beam of light passing through that portion of a film frame image which is exposed by said aperture, said beam impinging upon a mirror and being reflected thereby onto said curved screen, rotating said mirror continuously to rotate the reflected beam to sweep the projection area of the screen, said mirror being rotated at an angular velocity such as to project successive increments of each film frame image successively onto said curved screen with each increment projected thereon as a stationary image, and spacing successive film frame images on said film in such manner that said mirror, on completing each successive revolution, will occupy the same relative position to corresponding increments of successive film frame images as they move past said gate aperture.

5. The method of projecting motion pictures upon a concave curved screen, which comprises continuously advancing a film having a series of film frame images thereon through a gate having an aperture shorter than the length of said images so that only a portion of each of said images is exposed at one time, scanning the advancing film with a stationary beam of light passing through that portion of a film frame image which is exposed by said aperture, said beam impinging upon a mirror and being reflected thereby onto said curved screen, and rotating said mirror continuously to rotate the reflected beam to sweep the projection area of the screen, said mirror being rotated at an angular velocity such as to project successive increments of each film frame image successively onto said curved screen with each increment projected thereon as a stationary image, and spacing successive film frame images on said film in such manner that the distance between successive film frame image centers bears the same ratio to the length of the film frame images as 360° bears to one half of the arc of the projection area of the screen.

6. The method of projecting motion pictures upon a curved screen which comprises continuously advancing a film having a series of film frame images thereon through a gate having an aperture shorter than the length of said images so that only a portion of each of said images is exposed at one time, scanning the advancing film with a stationary beam of light passing through that portion of a film frame image which is exposed by said aperture, said beam impinging upon a mirror system having a plurality of angularly spaced mirror surfaces and being reflected thereby onto said curved screen, rotating said mirror system continuously to rotate the reflected beam to sweep the projection area of the screen, said mirror system being rotated at an angular velocity which bears the same ratio to one half of the arc of the projection area of the screen as the linear velocity of the film bears to the length of a film frame image, and spacing successive film frame images on said film in such manner that the distance between successive film frame centers bears the same ratio to the length of the film frame image as 360° divided by the number of mirror surfaces bears to one half of the projection area of the screen.

7. Apparatus for projecting motion pictures, comprising, a concave curved screen, a gate having an aperture therein of a length less than the length of a film frame image, means for continuously advancing a film having a series of film frame images thereon through said gate, a fixed source of light directing a fixed beam through said gate aperture and through said advancing film to scan successive increments of a film frame image passing said gate aperture, a mirror mounted for rotation on an axis substantially concentric with the center of curvature of said screen, said mirror being adapted to receive and reflect said beam as a rotating beam which projects successive increments of said film frame image successively onto successive contiguous areas of said screen, and means to rotate said mirror in timed relation with said film such that each successive increment of the projected image forms a stationary image on the screen.

FRED WALLER.

REFERENCES CITED

The following references are of record in the file of this patent:

UNITED STATES PATENTS

| Number | Name | Date |
|---|---|---|
| 1,409,107 | Higginson | Mar. 7, 1922 |
| 1,539,579 | Kucharski | May 26, 1925 |
| 1,713,503 | Von Madaler | May 14, 1929 |
| 2,068,410 | Hanke et al. | Jan. 19, 1937 |

FOREIGN PATENTS

| Number | Country | Date |
|---|---|---|
| 236,257 | Great Britain | July 9, 1925 |
| 275,988 | Germany | June 30, 1914 |
| 372,231 | France | Feb. 14, 1907 |